(12) United States Patent
Iida

(10) Patent No.: US 11,613,304 B2  
(45) Date of Patent: Mar. 28, 2023

(54) ELECTRIC POWER STEERING APPARATUS

(71) Applicant: Mitsubishi Electric Corporation, Tokyo (JP)

(72) Inventor: Hajime Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1182 days.

(21) Appl. No.: 16/085,641

(22) PCT Filed: Apr. 8, 2016

(86) PCT No.: PCT/JP2016/061545  
§ 371 (c)(1),  
(2) Date: Sep. 17, 2018

(87) PCT Pub. No.: WO2017/175381  
PCT Pub. Date: Oct. 12, 2017

(65) Prior Publication Data  
US 2020/0290670 A1    Sep. 17, 2020

(51) Int. Cl.  
*B62D 5/04* (2006.01)  
*H02M 3/158* (2006.01)

(52) U.S. Cl.  
CPC ......... *B62D 5/0481* (2013.01); *B62D 5/0406* (2013.01); *B62D 5/0463* (2013.01); *H02M 3/1582* (2013.01)

(58) Field of Classification Search  
CPC .. B62D 5/0481; B62D 5/0406; B62D 5/0463; B62D 5/0484; H02J 7/007182; H02J 7/0063; H02M 3/1582; H02M 3/1584  
See application file for complete search history.

(56) References Cited

U.S. PATENT DOCUMENTS

| | | | |
|---|---|---|---|
| 2005/0258792 A1* | 11/2005 | Matsuda | H02M 7/48 318/432 |
| 2008/0053721 A1* | 3/2008 | Hoshiba | B62D 5/0481 180/65.27 |

(Continued)

FOREIGN PATENT DOCUMENTS

| JP | 2003-267248 A | 9/2003 |
|---|---|---|
| JP | 2008-018761 A | 1/2008 |

(Continued)

OTHER PUBLICATIONS

International Search Report for PCT/JP2016/061545 dated Jun. 14, 2016 [PCT/ISA/210].

*Primary Examiner* — Jeff A Burke  
*Assistant Examiner* — Mohamad O El Sayah  
(74) *Attorney, Agent, or Firm* — Sughrue Mion, PLLC; Richard C. Turner

(57) ABSTRACT

A plurality of power supply circuits include a second power supply circuit for a CPU included in a control unit and a first power supply circuit for another circuit. An output voltage from the first power supply circuit is higher than an output voltage from the second power supply circuit. A range of input voltage is divided into three levels of voltage sub-ranges in accordance with a requirements specification. When the input voltage falls within a lower level voltage sub-range, both of an output function of the first power supply circuit and an output function of the second power supply circuit are stopped. When the input voltage falls within an intermediate level voltage sub-range, the output function of the first power supply circuit is stopped. When the input voltage falls within an upper level voltage sub-range, all circuits are controlled so as to operate.

11 Claims, 3 Drawing Sheets

(56) References Cited

U.S. PATENT DOCUMENTS

2011/0264326 A1 10/2011 Iwasaki
2018/0034403 A1* 2/2018 Kim ..................... F25B 49/025

FOREIGN PATENT DOCUMENTS

| JP | 2009-056835 A | 3/2009 |
| JP | 2013-241030 A | 12/2013 |

* cited by examiner

ELECTRIC POWER STEERING APPARATUS

CROSS REFERENCE TO RELATED APPLICATIONS

This application is a National Stage of International Application No. PCT/JP2016/061545 filed Apr. 8, 2016.

TECHNICAL FIELD

The present invention relates to an electric power steering apparatus, and more particularly, to functions of power supply circuits to cope with fluctuations in battery voltage.

BACKGROUND ART

In an electric power steering apparatus, power is supplied to circuits by power supply from an in-vehicle battery. However, the in-vehicle battery has a large voltage fluctuation and has a sharp voltage drop, in particular, at a time of engine start.

As the related art, there exists an electric power steering apparatus including a step-up circuit for ensuring an operation of an arithmetic circuit, in which a minimum operating voltage of the step-up circuit is set to a value lower than a decreased voltage, which is predicted to be decreased at the time of engine start (see, for example, Patent Literature 1).

CITATION LIST

Patent Literature

[PTL 1] JP 4816293 B2

SUMMARY OF INVENTION

Technical Problem

However, the related art has the following problems. In a related-art structure disclosed in Patent Literature 1, the predicted voltage, which is a battery voltage predicted to be decreased at the time of engine start, is set, and the minimum operating voltage of the step-up circuit is designed to be lower than the set predicted voltage. In this manner, even at the time of engine start, the arithmetic circuit, for example, a CPU, can be operated normally without being undesirably reset.

For example, as described in Patent Literature 1, a case in which the predicted decreased battery voltage is set to 5 V, the minimum operating voltage of the step-up circuit is set to 3 V, and a stepped-up voltage is ensured to be 9 V is now examined. In this case, when it is considered that assist control of assisting a steering force, which is a basic function of power steering, is performed, components to be driven at a low current such as a sensor and a CPU, which are mounted therein, are ensured to be operated normally at the stepped-up voltage of 9 V.

For example, when the battery voltage is in the vicinity of a range of from 6 V to 8 V, however, it is highly doubtful whether a predefined current can be supplied to a motor that assists the steering force. Further, when the battery voltage stays in the vicinity of the minimum operating voltage of the step-up circuit for a long period of time, power consumption of the step-up circuit is large, and hence needless step-up power may be operated. Further, the battery voltage staying in the vicinity of the minimum operating voltage for a long period of time may obstruct the engine start.

The present invention has been made to solve the problems described above, and has an object to provide an electric power steering apparatus capable of preventing needless power consumption even when a battery voltage fluctuates.

Solution to Problem

According to one embodiment of the present invention, there is provided an electric power steering apparatus including: an electric motor configured to rotate a steering mechanism of a vehicle; and a control unit, which is configured to drive the electric motor, and includes a CPU serving as a controller and a plurality of power supply circuits; and a power supply control circuit configured to output a stop signal for individually stopping output functions of the plurality of power supply circuits based on a result of reading an input voltage supplied in common to the plurality of power supply circuits, the plurality of power supply circuits including: a first power supply circuit configured to generate from the input voltage a first output voltage to be supplied to a circuit other than the CPU; and a second power supply circuit configured to generate from the input voltage a second output voltage to be supplied to the CPU included in the control unit, wherein the first output voltage is higher than the second output voltage, wherein the power supply control circuit has at least three voltage sub-ranges being an upper level voltage sub-range, an intermediate level voltage sub-range, and a lower level voltage sub-range obtained by dividing a range of the input voltage, the at least three voltage sub-ranges being preset in accordance with a requirements specification, and wherein the power supply control circuit is configured to control the first power supply circuit and the second power supply circuit by, in accordance with the result of reading the input voltage, outputting the stop signal to both the first power supply circuit and the second power supply circuit when the input voltage falls within the lower level voltage sub-range, outputting the stop signal to the first power supply circuit when the input voltage falls within the intermediate level voltage sub-range, and preventing the stop signal from being output when the input voltage falls within the upper level voltage sub-range.

Advantageous Effects of Invention

According to one embodiment of the present invention, the electric power steering apparatus has the following configuration. Specifically, the control unit includes at least two power supply circuits, and the range of the input voltage to be supplied to the electric power steering apparatus is divided into at least three sub-ranges in accordance with the requirements specification, to thereby enable execution and stop of output functions of the respective power supply circuits to be controlled in accordance with the voltage sub-range within which the input voltage falls. As a result, it is possible to provide the electric power steering apparatus capable of preventing needless power consumption even when the battery voltage fluctuates.

DESCRIPTION OF EMBODIMENTS

An electric power steering apparatus according to the present invention is now described in detail with reference to the drawings.

First Embodiment

Figure 1:
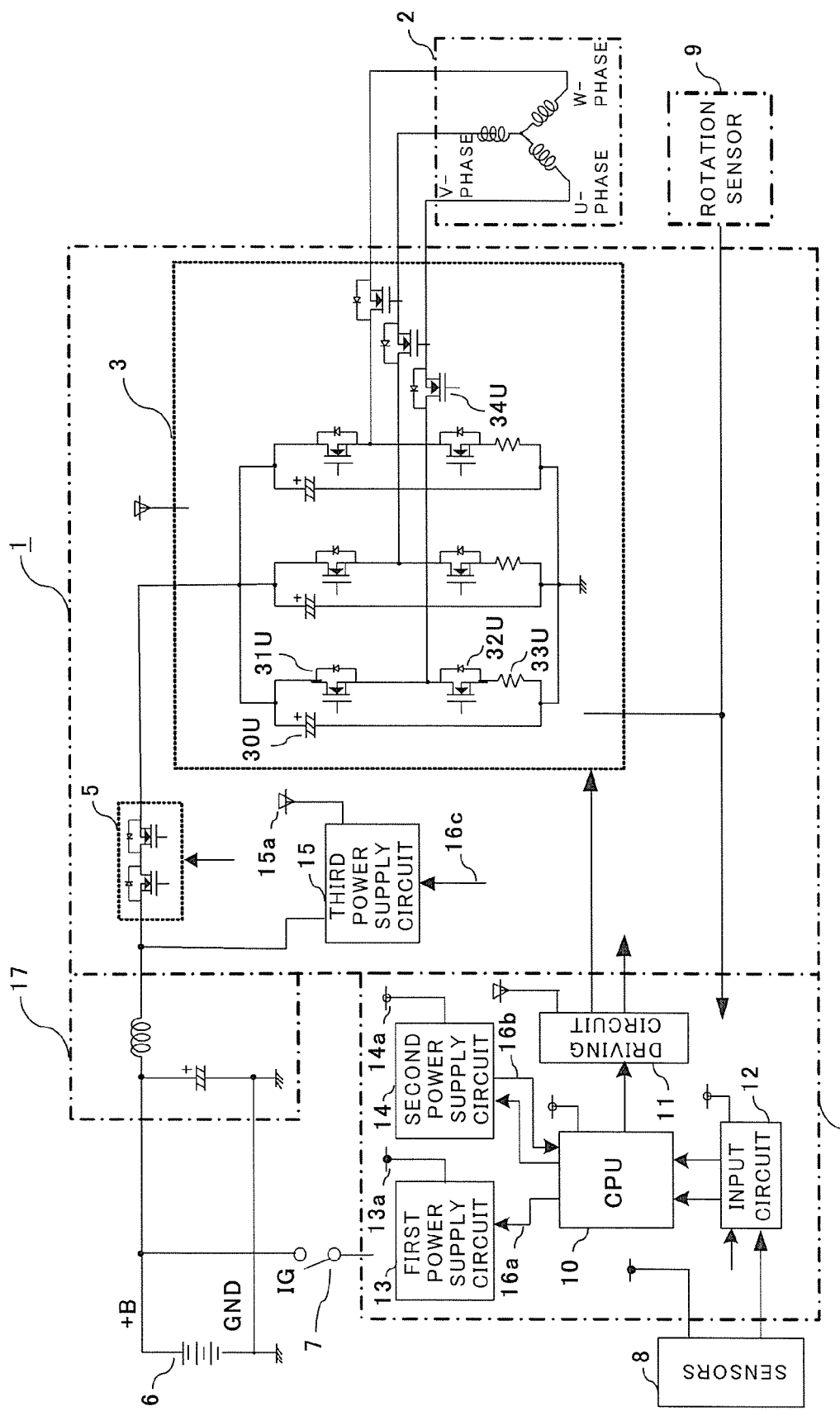
FIG. 1 is an overall circuit diagram of an electric power steering apparatus according to a first embodiment of the present invention.

FIG. 1 is an overall circuit diagram of an electric power steering apparatus according to a first embodiment of the present invention. The electric power steering apparatus according to the first embodiment of the present invention includes a control unit 1 and two sets of motors 2 having three phases. Further, the control unit 1 mainly includes a control circuit 4 including a CPU 10, an inverter circuit 3 configured to supply a current to the motor 2, power relay switching elements 5, and a filter 17.

Power supplies +B and GND from a battery 6 mounted in a vehicle are connected to the control unit 1 through the filter 17. When an ignition switch (IG) 7 is turned on, the power supply from the battery 6 is input to a first power supply circuit 13, a second power supply circuit 14, and a third power supply circuit 15 of the control circuit 4.

Further, information from, for example, a torque sensor configured to detect a steering torque, which is mounted in the vicinity of a steering wheel, a speed sensor configured to detect a travel speed of the vehicle, and other sensors is input from sensors 8 to the control circuit 4. The information from the sensors 8 is transmitted to the CPU 10 through an input circuit 12 of the control circuit 4.

The CPU 10 calculates a current value being a control amount for rotating the motor 2 from the input information and outputs the calculated current value. The output signal is transmitted to a driving circuit 11, which constructs an output circuit, and to the inverter circuit 3.

The driving circuit 11 receives a command signal from the CPU 10 and outputs a driving signal for driving switching elements of the inverter circuit 3. Only a small current flows through the driving circuit 11, and hence the driving circuit 11 is mounted in the control circuit 4. However, the driving circuit 11 can also be provided in the inverter circuit 3.

The inverter circuit 3 mainly includes upper arm switching elements 31 and lower arm switching elements 32 for three-phase windings (U-phase, V-phase, and W-phase) of the motor 2, motor relay switching elements 34 configured to connect and disconnect wirings to and from motor windings, current detection shunt resistors 33, and noise suppression capacitors 30. The inverter circuit 3 has the same circuit configuration for the windings of the respective phases and can supply currents to the windings of the respective phases in an independent manner.

A potential difference across both ends of each of the shunt resistors 33 and, for example, a voltage at a terminal of the motor winding are also transmitted to the input circuit 12. The above-mentioned information is also input to the CPU 10. Then, the CPU 10 calculates a difference between the calculated current value and a corresponding detection value to perform so-called feedback control. In this manner, a desired motor current is supplied to assist a steering force.

Further, a driving signal for the power supply relay switching elements 5 operating as a relay configured to connect and disconnect the battery +B and the power supply of the inverter circuit 3 is output from the CPU 10. The CPU 10 can interrupt current supply to the motor 2 itself by controlling the power relay switching elements 5. The motor relay switching elements 34 are each arranged between the inverter circuit 3 and the motor 2 and are capable of interrupting the respective phases Further, in order to suppress emission of noise generated by PWM drive of the inverter circuit 3, the filter 17 including a capacitor and a coil is arranged in the vicinity of the battery 6 (+B, GND). A large current flows through the power supply relay switching elements 5, and heat is generated thereby. Therefore, the power supply relay switching elements 5 may be included in the inverter circuit 3.

The CPU 10 has an abnormality detection function to detect an abnormality of, for example, the driving circuit 11, the inverter circuit 3, and the motor windings. When detecting an abnormality, the CPU 10 can interrupt the current supply only to a predetermined phase in accordance with the abnormality. Specifically, the CPU 10 can interrupt the current supply only to the predetermined phase by turning off the upper switching element 31, the lower switching element 32, and the motor relay switching element 34 of the phase in which the abnormality has occurred. Alternatively, in order to shut off the power supply itself, the CPU 10 can turn off the power supply relay switching elements 5.

The motor 2 is a brushless motor including the three-phase windings connected in a star configuration. The motor 2 is a brushless motor, and therefore a rotation sensor 9 configured to detect a rotational position of a rotor is mounted therein. Rotation information detected by the rotation sensor 9 is also transmitted to the input circuit 12 of the control circuit 4.

The motor 2 is not required to be the brushless motor including the three-phase windings connected in the star configuration, and may be a brushless motor including three-phase windings connected in a delta configuration or may be a brush motor having two pairs of two poles. Further, as a winding specification, distributed winding or concentrated winding can be adopted as in a case of a related-art apparatus. Further, the motor 2 may be a double three-phase motor including two windings. In this case, two inverter circuits 3 are required for two sets of three-phase windings.

Now, the power supply circuits of the control unit 1 are described. The electric power steering apparatus according to the first embodiment includes three power supply circuits having different output voltages.

The first power supply circuit 13 is a power supply to be mainly used for the sensors 8, and outputs, for example, 6.5 V. The second power supply circuit 14 is a power supply to be mainly used for the CPU 10, and outputs 5 V. The third power supply circuit 15 is a power supply to be used for the inverter circuit 3, and is a step-up power supply configured to output a voltage that is higher than the battery voltage by about 10 V.

In FIG. 1, the output voltage from the first power supply circuit 13 is indicated by the solid circle, the output voltage from the second power supply circuit 14 is indicated by the circle, and the output voltage from the third power supply circuit 15 is indicated by the inverted triangle. The first power supply circuit 13, the second power supply circuit 14, and the third power supply circuit 15 are connected to the CPU 10 through signal lines 16a, 16b, and 16c, respectively.

Figure 2:
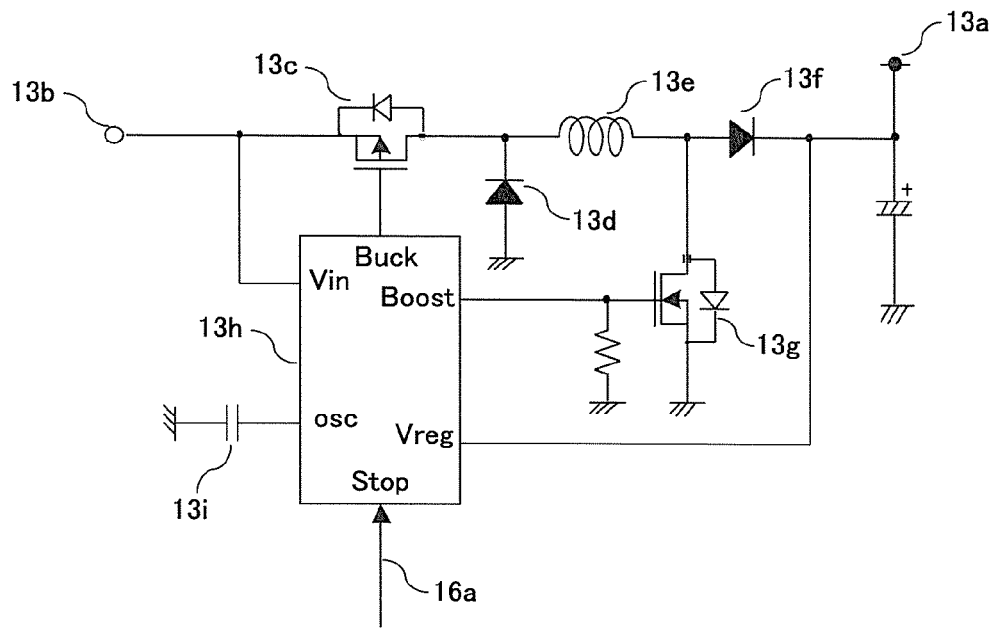
FIG. 2 is a diagram for illustrating a circuit configuration of a power supply circuit in the first embodiment of the present invention.

FIG. 2 is a diagram for illustrating a circuit configuration of the power supply circuit in the first embodiment of the present invention. The power supply circuits have substantially the same functions. Therefore, specific functions are described taking the first power supply circuit 13 as an example with reference to FIG. 2.

The first power supply circuit 13 has both of a step-down function and a step-up function. The power from the battery 6 is supplied to a terminal 13b via the ignition switch 7. A driver circuit 13h controls a step-down switching element 13c and a step-up switching element 13g.

A step-down section includes the switching element 13c, a diode 13d, and an inductance 13e. A step-up section includes the switching element 13g, a diode 13f, and the inductance 13e.

Therefore, the driver circuit 13h has a step-down buck-boost (Buck) terminal and a step-up boost (Boost) terminal. The driver circuit 13h has a Vreg terminal for voltage feedback to an output terminal 13a and an osc terminal, to which a capacitor 13i for oscillation is connected.

Further, when an external signal is input to a Stop terminal of the driver circuit 13h, the driver circuit 13h stops the output signal. As a result, the step-up function and the step-down function are stopped, and hence the voltage is not output from the output terminal 13a.

When the voltage from the battery 6 is, for example, 8 V or higher, the first power supply circuit 13 outputs a constant voltage of 6.5 V from the output terminal 13a through the step-down function. Further, when the voltage from the battery 6 falls within a range of from 5 V to 8 V, the step-up function of the first power supply circuit 13 is also actuated to ensure the output voltage of 6.5 V. Further, when the voltage from the battery 6 becomes, for example, less than 4 V, the first power supply circuit 13 completely fails to generate the voltage to be output from the output terminal 13a.

In general, when the input voltage input to the terminal 13b falls within a range of from 4 V to 5 V, the first power supply circuit 13 constructed of the circuit as illustrated in FIG. 2 operates. However, there is a possibility that the first power supply circuit 13 cannot output the constant voltage of 6.5 V. Specifically, a region of input voltage in which the functions as the first power supply circuit 13 cannot be ensured (the region is hereinafter referred to as "incomplete region") exists without exception.

As described above, when the first power supply circuit 13 is used with the input voltage falling within the incomplete region, for example, the power supplied to the sensors 8 is not stabilized. As a result, the sensors 8 undesirably operate at a low voltage, and hence data acquired from the sensors 8 may be imprecise.

Therefore, when the input voltage falls within the incomplete region described above, the first power supply circuit 13 is unable to be used. In other words, when the input voltage falls within the incomplete region described above, the first power supply circuit 13 is not required to be operated. When the first power supply circuit 13 is operated, the current is needlessly consumed.

Therefore, the CPU 10 monitors the voltage of the battery 6 or the voltage of the ignition switch 7 through the input circuit 12. When the monitored voltage falls within the incomplete region or below the incomplete region (for example, becomes 5 V or lower), the CPU 10 outputs a control signal to the Stop terminal to stop the first power supply circuit 13.

As described above, the electric power steering apparatus according to the first embodiment monitors the incomplete region by the CPU 10. In the incomplete region, the functions of the power supply circuit itself are stopped to reduce the needlessly consumed current.

In the specific example described above, the output of a Stop signal via the CPU 10 has been described. However, a configuration of the present invention is not limited to the configuration described above. The Stop signal can also be output through a circuit network (power supply control circuit) provided in place of the CPU 10.

The second power supply circuit 14 is now described. The second power supply circuit 14 has approximately the same step-up and step-down functions as the above-mentioned step-up and step-down functions of the first power supply circuit 13. However, the second power supply circuit 14 differs from the first power supply circuit 13 in voltage to be supplied to the respective components. Specifically, the second power supply circuit 14 outputs the output voltage of 5 V to be mainly supplied to the CPU 10, the input circuit 12, and a peripheral circuit thereof.

Therefore, the output voltage of 5 V to be supplied from the second power supply circuit 14 requires accuracy. As described above, when the input voltage becomes equal to or lower than 5 V, the first power supply circuit 13 stops the step-up function. Based on the above-mentioned operation, the second power supply circuit 14 is required to be set so as to be able to supply 5 V with the voltage lower than 5 V, for example, even with a voltage as low as 3.5 V.

The second power supply circuit 14 cannot ensure 5 V as the output voltage when the input voltage is less than 3 V. Therefore, the second power supply circuit 14 is required to have such a Stop function as to stop the output when the input voltage becomes equal to or lower than 3.5 V.

The CPU 10 generally has a voltage monitoring function for, for example, an A/D converter. Therefore, unless the voltage supplied from the second power supply circuit 14 to the CPU 10 is an accurate constant voltage, the voltage cannot be accurately monitored.

In view of the fact described above, the following configuration can also be adopted. Specifically, the output voltage of 5 V from the second power supply circuit 14 is directly monitored by a voltage monitoring circuit (not shown) being an additional circuit. When the output voltage becomes, for example, 4.7 V or lower, the CPU 10 is reset or an abnormality signal for informing of a power supply abnormality is transmitted to the CPU 10.

The reason that two signal lines 16b are illustrated between the second power supply circuit 14 and the CPU 10 in FIG. 1 is for the transmission of the abnormality signal described above. The signal line 16b, which is input from the CPU 10 to the second power supply circuit 14, corresponds to the Stop control signal output from the CPU 10. The signal line 16b, which is input from the additional circuit included in the second power supply circuit 14 to the CPU 10, corresponds to an abnormal signal indicating a decrease in constant voltage of 5 V output from the additional circuit.

As the final power supply circuit, the third power supply circuit 15 is described. The third power supply circuit 15 is a step-up circuit mainly for the switching elements 31, 32, and 34 of the inverter circuit 3. Therefore, the third power supply circuit 15 is not required to have the step-down function. An output voltage 15a stepped up by the third power supply circuit 15 is a voltage that is higher than the battery voltage by 10 V.

The output voltage from the third power supply circuit 15 is not required to be as accurate as the output voltages from the first power supply circuit 13 and the second power supply circuit 14, and is only required to be about 10 V. The reason is because the output voltage from the third power supply circuit 15 is used to drive the switching elements, and when FETs are used as the switching elements, the FETs can be satisfactorily driven at about 10 V, which is higher than a drain voltage.

A normal operation range of the electric power steering apparatus in the first embodiment is defined as the battery voltage of 10 V or higher. In this case, when the battery voltage is 10 V or higher, all the circuits including the power supply circuits operate normally, and a desired current is required to be supplied to the motor 2.

Meanwhile, there is adopted a specification in which a predefined current is not required to be supplied to the motor 2 or the control is stopped when the battery voltage is less than 10 V, for example, falls within a voltage range of 8 V or more and less than 10 V. Further, there is adopted a specification in which the control is interrupted when the battery voltage is a low voltage less than 8 V.

First, a case in which the voltage at which the control is interrupted is less than 8 V and the battery voltage is less than 8 V is considered. In this case, there is no advantage in actuating the step-up function of the third power supply circuit 15. When the step-up function is operated in this case, not only the current is needlessly consumed but also the current consumption of the third power supply circuit 15 itself tends to increase as the battery voltage is decreased. In addition, heat generation is increased.

Therefore, when the battery voltage is less than 8 V, the CPU 10 or the additional circuit (not shown) outputs the Stop signal for stopping the third power supply circuit 15 based on the result of voltage monitoring.

When the battery voltage falls within the range of from 8 V to 10 V, the CPU 10 does not output the Stop signal. However, the CPU 10 can switch to control for limiting the predefined current to be supplied to the motor 2.

Figure 3:
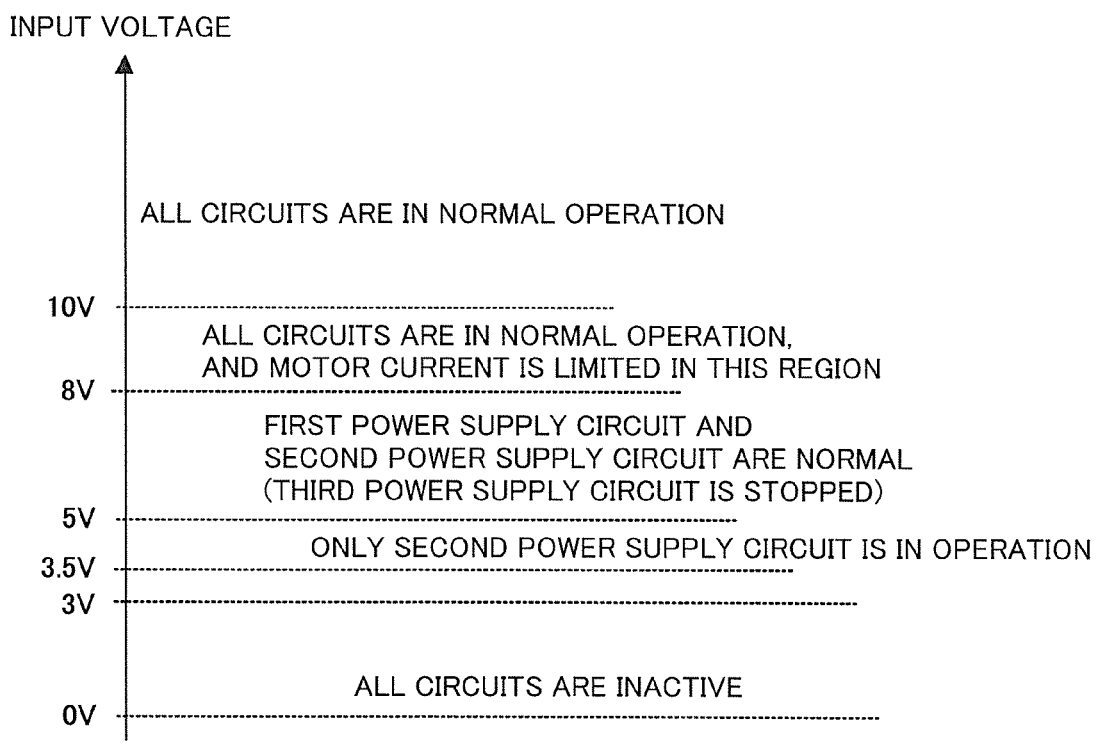
FIG. 3 is an explanatory chart for showing an overall range of operating voltage for the power supply circuits in the first embodiment of the present invention.

FIG. 3 is an explanatory chart for collectively showing how a system and the circuits operate with the input voltage supplied from the battery 6 to each of the power supply circuits based on the above descriptions. FIG. 3 is an explanatory chart for showing an overall range of operating voltage for the power supply circuits in the first embodiment of the present invention.

A vertical axis of FIG. 3 indicates the input voltage to be supplied to each of the first power supply circuit 13, the second power supply circuit 14, and the third power supply circuit 15, and corresponds to the battery voltage or an IG voltage.

When the input voltage is equal to or higher than 10 V, all the circuits and all the functions operate normally. When the input voltage is equal to or higher than 10 V, the first power supply circuit 13 outputs 6.5 V, the second power supply circuit 14 outputs 5.0 V, and the third power supply circuit 15 outputs the voltage that is higher than the battery voltage by 10 V.

Even when the input voltage falls within a range of from 8 V to 10 V, all the power supply circuits operate normally. In the above-mentioned range, however, the predefined current to be supplied to the motor 2 is limited.

When the input voltage falls within a range of from 5 V to 8 V, only the first power supply circuit 13 and the second power supply circuit 14 operate normally, and the third power supply circuit 15 stops the output. As the operation of the electric power steering apparatus, although motor current supply control is stopped, the CPU 10 and the sensors 8 are in operation.

Specifically, under the above-mentioned state, only a driver is stopped or interrupted. Therefore, the above-mentioned state corresponds to a standby state in which the control is ready to be started when the power supply voltage rises again.

When the input voltage falls within a range of from 3.5 V to 5 V, only the second power supply circuit 14 operates normally. When the input voltage falls within a range of less than 3 v, all the functions and all the circuits are brought into a stopped state.

When the input voltage falls within a range of from 3 V to 3.5 V, the second power supply 14 is in operation but is in an unstable state in which it is doubtful whether the constant voltage of 5 V is successfully output. When the input voltage falls within the above-mentioned range, another circuit can be provided so as to monitor the output voltage of the second power supply circuit 14 as described above and stop the CPU 10 at a time when, for example, the output voltage becomes equal to or lower than 4.7 V.

With such another circuit, the CPU 10 can be operated normally when the output voltage is higher than 4.7 V and can be stopped when the output voltage is less than 4.7 V. As a result, the operation of the CPU 10 is prevented from becoming unstable when the input voltage falls within the range of from 3 V to 3.5 V.

As described above, according to the first embodiment, the control unit including the plurality of power supply circuits has the configuration capable of stopping the output function of each of the power supply circuits in the region in which the output function is not required, in accordance with the voltage supplied to each of the plurality of power supply circuits. With the configuration described above, the needless current consumption in the power supply circuits can be reduced. Further, the heat generation from the power supply circuits themselves can also be suppressed.

In particular, by setting the power supply circuit for the CPU among the plurality of power supply circuits such that the power supply circuit operates even at the lowest voltage, it is possible to assign the CPU with the control of the other power supply circuits. Through adoption of the setting described above, the additional circuit can be eliminated.

Second Embodiment

In a second embodiment of the present invention, description is given of a case in which the minimum operating voltages of the respective power supply circuits are different from the minimum operating voltages in the first embodiment described above. A circuit configuration of an electric power steering apparatus according to the second embodiment is equivalent to the circuit configuration illustrated in FIG. 1 in the first embodiment described above.

Figure 4:
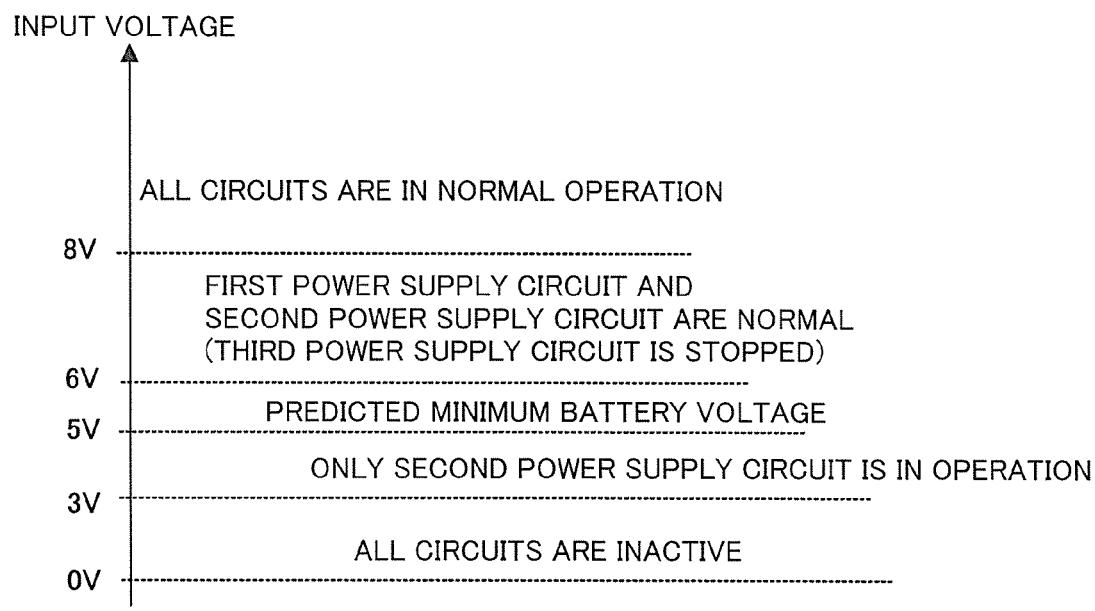
FIG. 4 is an explanatory chart for showing an overall range of operating voltage for the power supply circuits in a second embodiment of the present invention.

FIG. 4 is an explanatory chart for showing an overall range of operating voltage for the power supply circuits in the second embodiment of the present invention. The vertical axis of FIG. 4 indicates the input voltage to be supplied to each of the first power supply circuit 13, the second power supply circuit 14, and the third power supply circuit 15, which corresponds to the battery voltage or the IG voltage.

The third power supply circuit 15 is required to operate normally when the input voltage is equal to or higher than 8 V, as shown in FIG. 4. Therefore, the third power supply circuit 15 itself operates so as to generate the predefined output voltage when the input voltage falls within at least a range of, for example, 6 V or more and less than 8 V. However, in order to ensure the stable operation, the CPU 10 or the additional circuit performs control so that the third power supply circuit 15 stops the output at the time when the battery voltage becomes less than 8 V.

The output voltage 13a from the first power supply circuit 13 is mainly supplied to the sensors 8. Therefore, the minimum operating voltage of the first power supply circuit 13 is lower than the battery voltage that is predicted at the time of engine start and is set to, for example, 3 V. The other functions are the same as the functions of the first power supply circuit 13 in the first embodiment described above. When an external signal is input to the Stop terminal, the first power supply circuit 13 in the second embodiment is brought into a state in which the output voltage 13a is not output therefrom.

For example, for some actual product specifications, performance of the sensors 8 is not required to be ensured with the battery voltage lower than 3 V. In such a case, the first power supply circuit 13 is not required to be operated when the battery voltage is lower than 3 V. When the first power supply circuit 13 is operated with the battery voltage lower than 3 V, power is needlessly consumed. Therefore, the CPU 10 monitors the battery voltage or the voltage of the ignition switch 7 through the input circuit 12. Then, when the monitored voltage value falls within a region in which the first power supply circuit 13 is not required to be operated, for example, becomes equal to or lower than 6 V, the CPU 10 outputs the control signal to the Stop terminal to stop the first power supply circuit 13.

The second power supply circuit 14 is required to output a predefined output voltage 14a when the battery voltage is equal to or higher than 3 V. Specifically, the second power supply circuit 14 outputs the minimum voltage lower than the minimum voltages of the other power supply circuits. The second power supply circuit 14 consumes the smallest current as compared to the current consumptions of the other power supply circuits. Therefore, even when the minimum operating voltage of the second power supply circuit 14 is low, the amount of needless current consumption of the second power supply circuit 14 is smaller than the amount of needless current consumptions of the other power supply circuits.

Further, the CPU 10 is supplied with the voltage from the second power supply circuit 14. Therefore, the CPU 10 does not output an erroneous control command or make an incorrect abnormality determination due to a fluctuation in power supply voltage as long as the predefined output voltage 14a is supplied to the second power supply circuit 14.

As described above, according to the second embodiment, whether the input voltage to the plurality of power supply circuits is below the region in which the operation is ensured is monitored by the CPU 10. The CPU can stop the functions of the power supply circuits themselves to reduce the needless current consumption when the input voltage is below the region in which the operation is ensured.

Various operation ensuring voltages are required for actual products. For the various operation ensuring voltages, the electric power steering apparatus according to the second embodiment changes the setting of a voltage to be monitored by the CPU in accordance with the product specifications to be able to flexibly comply with various product specifications. As a result, levels at which the output function is stopped can be appropriately defined for the respective power supply circuits in accordance with the product specifications. Thus, the needless current consumption of the power supply circuits can be reduced.

In the second embodiment, the output of the Stop signal through the CPU 10 has been described. However, the configuration of the present invention is not limited to the configuration described above. The Stop signal can be output through a circuit network (power supply control circuit) provided in place of the CPU 10.

The electric power steering apparatus including the three power supply circuits, that is, the first to third power supply circuits has been described in the first embodiment and the second embodiment. However, the present invention is not limited to the configuration described above. A configuration using two power supply circuits, specifically, a power supply for a CPU and a power supply for circuits other than the CPU or a configuration using four or more power supply circuits provided for sub-classified groups of circuits and components can be adopted to obtain the same effects.

A method of dividing the range of operating voltage is not limited to the division shown in FIG. 3 and the division shown in FIG. 4. Appropriate voltage level ranges can be defined in accordance with the requirements specification.

For example, in a case where two power supply circuits, specifically, a first power supply circuit and a second power supply circuit, are used, when the range of operating voltage is divided into three levels of voltage sub-ranges being an upper level voltage sub-range, an intermediate level voltage sub-range, and a lower level voltage sub-range, the two power supply circuits can be individually controlled in the following manner.

When the input voltage falls within the lower level voltage sub-range, a stop signal is output to both the first power supply circuit and the second power supply circuit to stop the output function of each of the first power supply circuit and the second power supply circuit.

When the input voltage falls within the intermediate level voltage sub-range, the stop signal is output to the first power supply circuit to stop its output function.

When the input voltage falls within the upper level voltage sub-range, the stop signal is not output and all the power supply circuits continuously operate normally.

The invention claimed is:

1. An electric power steering apparatus, comprising:
an electric motor to rotate a steering mechanism of a vehicle;
a control unit, which drives the electric motor, and includes a CPU and a plurality of power supply circuits; and
a power supply control circuit to output a stop signal for individually stopping output functions of the plurality of power supply circuits based on a result of reading an input voltage supplied in common to the plurality of power supply circuits,
the plurality of power supply circuits including:
a first power supply circuit to generate from the input voltage a first output voltage to be supplied to a circuit other than the CPU; and
a second power supply circuit to generate from the input voltage a second output voltage to be supplied to the CPU included in the control unit,
wherein the first output voltage is higher than the second output voltage, the first output voltage and the second output voltage being supplied at the same time,
wherein the power supply control circuit has at least three voltage sub-ranges being an upper level voltage sub-range, an intermediate level voltage sub-range, and a lower level voltage sub-range obtained by dividing a range of the input voltage, the at least three voltage sub-ranges being preset in accordance with a requirements specification, and wherein the power supply control circuit controls the first power supply circuit and the second power supply circuit by, in accordance with the result of reading the input voltage, outputting the stop signal to both the first power supply circuit and the second power supply circuit when the input voltage falls within the lower level voltage sub-range, outputting the stop signal to the first power supply circuit when the input voltage falls within the intermediate level voltage sub-range, and preventing the stop signal from being output when the input voltage falls within the upper level voltage sub-range.

2. The electric power steering apparatus according to claim 1,
wherein the first power supply circuit generates from the input voltage the first output voltage to be supplied to a circuit other than a driver for the electric motor and the CPU,
wherein the plurality of power supply circuits further include a third power supply circuit to generate from the input voltage a third output voltage to be supplied to the driver for the electric motor,
wherein the third output voltage is higher than the first output voltage and the second output voltage,
wherein the power supply control circuit further has a first upper level voltage sub-range and a second upper level voltage sub-range higher than the first upper level voltage sub-range, which are preset as two upper level voltage sub-ranges obtained by dividing the upper level voltage sub-range of the range of the input voltage in accordance with the requirements specification, and
wherein the power supply control circuit controls the first power supply circuit, the second power supply circuit, and the third power supply circuit by, in accordance with the result of reading the input voltage, outputting the stop signal to all of the first power supply circuit, the second power supply circuit, and the third power supply circuit when the input voltage falls within the lower level voltage sub-range, outputting the stop signal to the first power supply circuit and the third power supply circuit when the input voltage falls within the intermediate level voltage sub-range, outputting the stop signal to the third power supply circuit when the input voltage falls within the first upper level voltage sub-range of the upper level voltage range, and preventing the stop signal from being output when the input voltage falls within the second upper level voltage sub-range of the upper level voltage range.

3. The electric power steering apparatus according to claim 2, wherein the power supply control circuit is built into the CPU.

4. The electric power steering apparatus according to claim 3, wherein the third power supply circuit has a step-up function to output a voltage higher than the input voltage.

5. The electric power steering apparatus according to claim 2, wherein the third power supply circuit has a step-up function to output a voltage higher than the input voltage.

6. The electric power steering apparatus according to claim 2, wherein each of the first power supply circuit and the second power supply circuit has a step-up function to output a voltage higher than the input voltage and a step-down function to output a voltage lower than the input voltage.

7. The electric power steering apparatus according to claim 2, wherein each of the first power supply circuit and the second power supply circuit has a minimum operating voltage set to fall within a voltage range lower than a predicted decreased voltage, which is predicted based on a decrease in voltage of a battery being a supply source of the input voltage.

8. The electric power steering apparatus according to claim 2, further comprising a voltage monitoring circuit to monitor the second output voltage to be supplied to the CPU, and to output a reset signal or an abnormality signal for informing of a power supply abnormality to the CPU when the second output voltage becomes less than a preset allowable minimum value.

9. The electric power steering apparatus according to claim 1, wherein each of the first power supply circuit and the second power supply circuit has a step-up function to output a voltage higher than the input voltage and a step-down function to output a voltage lower than the input voltage.

10. The electric power steering apparatus according to claim 1, wherein each of the first power supply circuit and the second power supply circuit has a minimum operating voltage set to fall within a voltage range lower than a predicted decreased voltage, which is predicted based on a decrease in voltage of a battery being a supply source of the input voltage.

11. The electric power steering apparatus according to claim 1, further comprising a voltage monitoring circuit to monitor the second output voltage to be supplied to the CPU, and to output a reset signal or an abnormality signal for informing of a power supply abnormality to the CPU when the second output voltage becomes less than a preset allowable minimum value.

* * * * *